United States Patent [19]

Mostkoff

[11] Patent Number: 5,908,265
[45] Date of Patent: Jun. 1, 1999

[54] ARTIFICIAL REEF MODULE AND METHOD

[75] Inventor: Benjamin Joshua Mostkoff, Miami Beach, Fla.

[73] Assignee: Stability Reefs, Inc., Miami Beach, Fla.

[21] Appl. No.: 08/145,775

[22] Filed: Oct. 29, 1993

Related U.S. Application Data

[63] Continuation-in-part of application No. 07/948,159, Sep. 21, 1992, Pat. No. 5,259,695, which is a continuation of application No. 07/800,857, Nov. 26, 1991, abandoned.

[51] Int. Cl.$^6$ ..................................................... E02B 3/06
[52] U.S. Cl. ............................................... 405/29; 405/21
[58] Field of Search ................................ 405/24, 25, 30, 405/23, 32, 26, 29, 33

[56] References Cited

U.S. PATENT DOCUMENTS

| | | | |
|---|---|---|---|
| 1,812,300 | 6/1931 | Leeds et al. | 405/33 |
| 2,344,302 | 3/1944 | Harza | 61/37 |
| 2,766,592 | 10/1956 | Daniel et al. | 405/29 |
| 3,317,189 | 5/1967 | Rubenstein | 256/13.1 |
| 3,456,446 | 7/1969 | Kusatake | 405/29 |
| 3,786,997 | 1/1974 | Viner | 241/101.7 |
| 4,479,740 | 10/1984 | Schaaf et al. | 405/33 |
| 4,502,816 | 3/1985 | Creter, Jr. et al. | 405/25 X |
| 4,997,309 | 3/1991 | Kiselewski | 405/21 X |
| 5,080,526 | 1/1992 | Waters | 405/30 X |
| 5,229,051 | 7/1993 | Martin | 264/71 |

*Primary Examiner*—Victor Batson
*Attorney, Agent, or Firm*—Jack E. Dominik

[57] ABSTRACT

The formation of artificial reef modules which are primarily cast from concrete. Optionally, tire chips may be added to the concrete is disclosed. Most desirably, the concrete is "waste" concrete obtained from ready mix trucks which have a portion of their load to discharge at the termination of any given job. When tire chips are employed they, of course, are a product of salvaging automobile tires whether for crumb rubber, or otherwise. The modules are formed in an open mold which resembles various geometric solid shapes. Desirably the sides are roughened to have a washboard corrugated type configuration to cause undulations in the module itself which has been demonstrated to be further means of attracting marine life. A related aspect of the present invention looks to the provision of lifting means on each such module to permit the same, with relatively crude equipment, to be moved about in a factory site, onto trucks, onto barges, and off the barge to its ultimate resting place at the bottom of the sea. In connection with the method of forming the modules, an open-ended three-sided mold is formed in the shape of a tetrahedron with the open end facing up. The form is filled with a concrete. Optionally, tire "chips" may be used as an aggregate in the tetrahedron shaped mold with other geometric solid shaped molds optional. Therefore, a major objective is achieved by the present invention in developing a reef module which will inherently attract marine life when clustered with other like modules, while at the same time encapsulating waste material for which there are few environmentally enhancing forms of recycling.

1 Claim, 6 Drawing Sheets

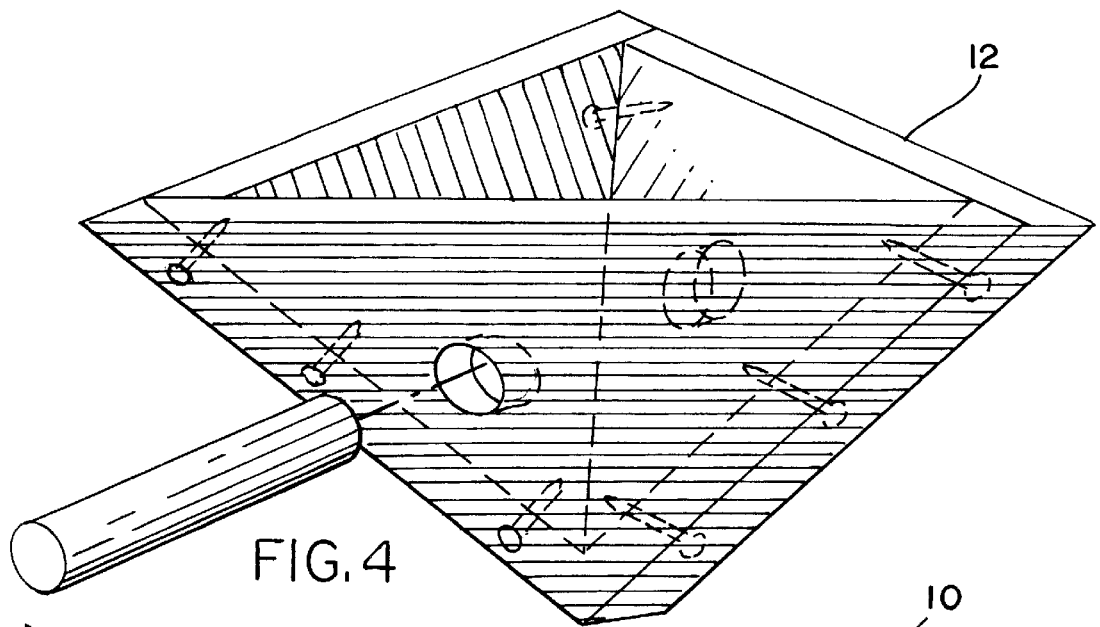
FIG. 4
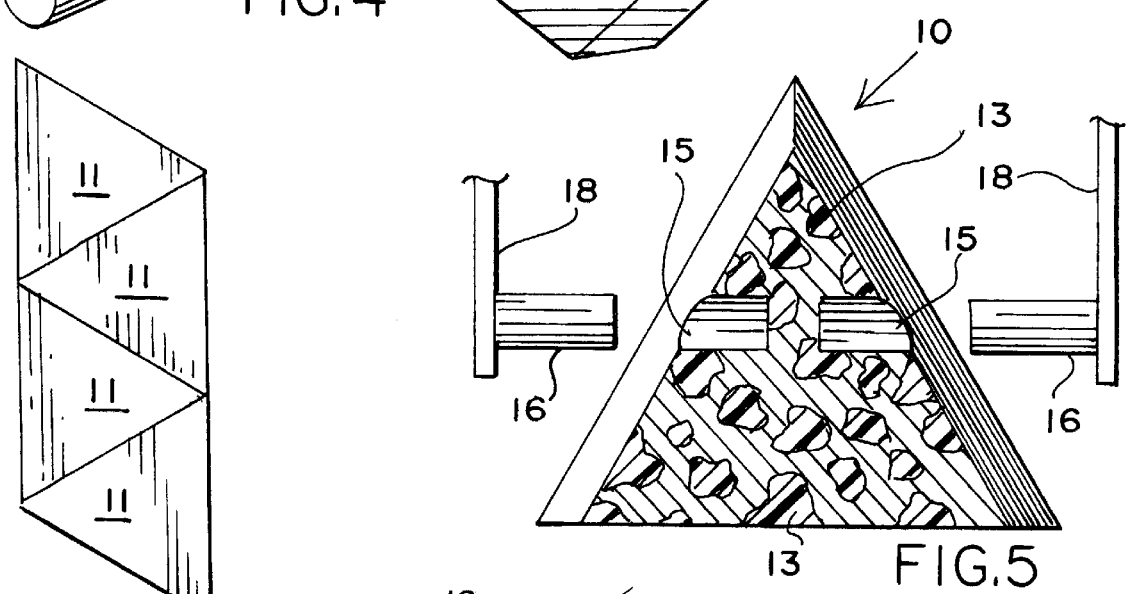
FIG. 6
FIG. 5
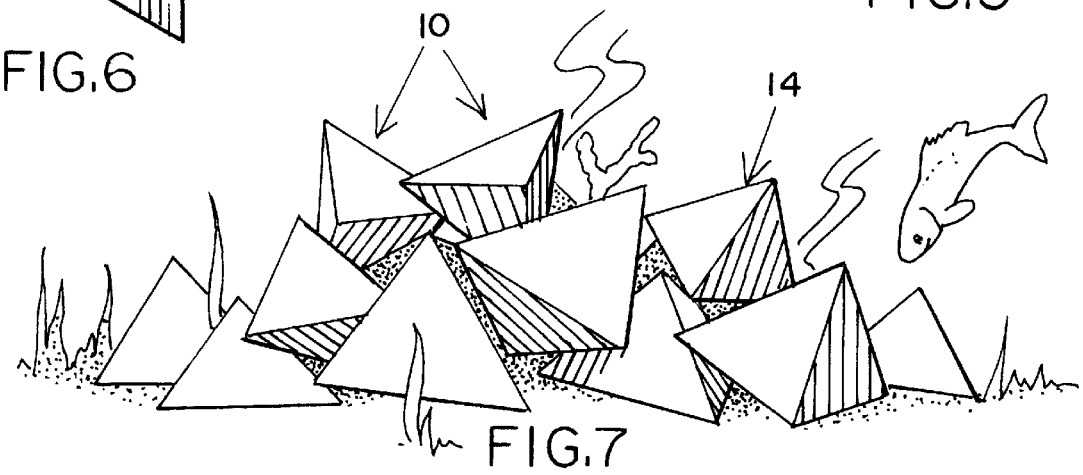
FIG. 7

ARTIFICIAL REEF MODULE AND METHOD

CROSS-REFERENCE TO RELATED APPLICATIONS

The present application is a continuation-in-part of application Ser. No. 948,159 filed Sep. 21, 1992 entitled "Artificial Reef Module and Method" and allowed on Apr. 22, 1993 as U.S. Pat. No. 5,259,695; which application is a continuation of Ser. No. 800,857 filed Nov. 26, 1991, entitled "Artificial Reef Module and Method", now abandoned.

FIELD OF THE INVENTION

The present invention relates to artificial reef modules and artificial reefs formed from such modules.

SUMMARY OF THE PRIOR ART

Ready mix concrete trucks dot the highways and byways of the United States and elsewhere throughout the world as they scurry to a job site to discharge a load of premix concrete. The concrete, once it is inside the ready mix truck, has a finite life in terms of hours. If not dispensed within that time period, it begins to harden and otherwise is not useful. If the hardening process persists long enough, a major effort is required to chip the concrete out of the truck's mixer drum. In many instances a truck will go to a job site where the contractor has overestimated the amount of concrete he needs. For example, if he has estimated four cubic yards for a job, and the job only requires three and one half cubic yards, one half a cubic yard will have to be disposed of since it is highly unlikely the driver would have time to go to another site to sell the waste concrete. Accordingly, there is a huge amount of concrete from ready mix trucks which is wasted and dumped in the United States and elsewhere throughout the world. Estimates state this amount can be anywhere from five to ten percent of the total amount of ready mix prepared. In addition, as the concrete is setting and is dumped onto the ground, various harsh chemicals can leach out and get into the soil beneath the dumped concrete causing an irritation if not contamination and violation of the environment.

Automobile tires, as well as truck tires and other industrial vehicular tires, whether on road or off road, pose a significant solid waste disposal problem on a global level. It is estimated that 280,000,000 or one tire per person, is being discarded each and every year in the United States alone. Secondary markets exist for the use of discarded tires and include: the re-treading or re-capping industry, utilization of portions of the tire for alternative purposes such as guard rail components, solid rubber tires (as used by forklifts), secondary fuel in electric power co-generation plants, and pulverization for use as component in paving surfaces such as roads and athletic tracks, to name a few. However, combined these secondary uses utilize less than 50% of the tire waste stream.

As a result of the serious growing concern of the real (mosquito, vermin breeding areas) and potential (fire and resulting air and water contamination) negative environmental effects of storing or stock-piling tires in large quantities in open air areas, many states in the United States have established guidelines and laws for the storage and disposal of tires. These requirements include that whole tires be stored in covered shelters and that tires stored outdoors must first be reduced to shreds and or chips which can then be disposed of as conventional trash in a landfill environment or utilized in one of the above referenced secondary markets.

The disposal of tire chips in a landfill also poses concern for certain states with limited landfill capacity. In fact certain states are under order by the U.S. Environmental Protection Agency to reduce significantly the use of existing landfills. Permits for the establishment of new landfills are also under much stricter guidelines and more difficult to obtain. Therefore the reduction of the waste stream to landfill locations is highly desirable.

Various size concrete blocks for use in artificial reefs or shore protection are exemplified in U.S. Pat. No. 3,456,446 issued Jul. 22, 1966 to Sugiaki Kusatake and Harza U.S. Pat. No. 2,344,302 issued Mar. 14, 1944. Various compositions for disposing of spent automobile tires, in whole or chipped form, which are a worldwide disposal problem, are exemplified in Rubenstein U.S. Pat. No. 3,317,189 issued May 2, 1967 and U.S. Pat. No. 4,080,793 of Mar. 28, 1978 to Paul Sifer.

The concept of disposing of spent automobile tires and even chipping them is well known. The concept of clustering disposed of automobile tires by ballasting and strapping them to each other and sinking as a reef is known. However, the well documented problem with this technique is that the strapping eventually succumbs to wave and or current energy and fails, breaking apart and subsequently washing up onto an adjacent shoreline or destroying surrounding natural habitat, thereby creating a greater problem than their use as artificial reef material attempted to solve. In fact, the utilization of tire bundles as artificial reef material is no longer authorized by the U.S. Army Corps of Engineers general permit for artificial reef construction.

Moreover, the concrete forms of artificial reef material have been disclosed in the prior art contained in a "Review of United States Patents Relating to Artificial Reef Technology" by Jeffrey G. Sheldon of Pasadena, Calif., the same being presented to the Third International Artificial Reef Conference Nov. 3–5, 1983 at Newport Beach, Calif. and published in The Bulletin of Marine Science, Volume 37 of July 1985. This sets forth in great detail efforts that have been made to develop modular units for use in artificial reef construction.

What is needed is a modular artificial reef unit which will lend itself to ease of formation, which can be produced inexpensively, which is easy to transport to a reef site, which can be fabricated out of otherwise wasted materials thereby recycling said materials and which, when deposited on the bottom of a body of water in quantities, will form a complex artificial reef system or enhanced aquatic habitat. Said habitat would have high spatial complexity which provides for a correspondingly high biological diversity for the breeding and growth of marine life. The random and interlocking nature of the modules provide for their use as breakwater or erosion structures.

SUMMARY OF THE INVENTION

The present invention is directed to the formation of tetrahedron shaped artificial reef modules which are primarily cast from concrete. Optionally, tire chips may be added to the concrete. Modules composed of the tire chip concrete mixture may resemble various geometric solid shapes which meet the criteria for simplified molding and handling. Said geometric solid shapes include, but are not limited to: pyramids, cubes, cones, prisms, rectangular boxes and hemispheres. Most desirably, the concrete is "waste" concrete obtained from ready mix trucks which have a portion of their load to dispose of at the termination of any given job. When tire chips are employed they, of course, are produced as a result of existing state and federal laws requiring tire volume reduction prior to landfill disposal or secondary market use (crumb rubber, or otherwise). The tetrahedron shape is comprised of four equilateral sides, each of which by definition is an equilateral triangle. The tetrahedron shaped module, (formed with concrete only or with tire chip aggregate concrete), may be of any size, but for production purposes, should be in excess of one foot on each edge, and restricted in maximum size only by the limitations of the equipment to be found at the molding and handling facility. The tetrahedron shaped modules are formed in an open topped mold having three equilateral sides. The sides of which may be smooth or roughened to have a washboard or corrugated type configuration, thereby creating undulations in the finished module. Surface irregularities such as this have been demonstrated to further the means by which encrusting aquatic organisms develop on artificial reef materials. Also, as a desirable option, all points and edges can be squared off by truncation as a means of providing additional surface area.

Upon deployment, the tetrahedron shaped unit seeks the path of least resistance through the water column, and orients itself point downward in a nearly vertical descent to the bottom. This allows for a dense, interlocking complex clustering of the units at the deployment site. Unless lowered to the bottom, conventionally shaped concrete artificial reef materials have a tendency to "scatter" off in different directions in settling to the bottom. This produces an artificial reef of lesser density and biological complexity.

A related aspect of the present invention looks to the provision of a lifting point(s) on each such equilateral tetrahedron to permit the same, with relatively crude equipment, to be moved about the production site, onto trucks, onto barges, and off the barge to its ultimate resting place at the bottom of the selected water body. In connection with the method of forming tetrahedron shaped modules, an open-ended three-sided mold is formed in the shape of a tetrahedron with the open end up. The form is filled with a concrete. Optionally, tire "chips" may be used as an aggregate. The proportions are not necessarily critical to the invention but exemplary of the mix and the result which can be obtained, namely, with an exemplary tetrahedron three feet on each edge, approximately 2.3 tires, (assumption: 1 tire=20 lbs. or 100 tires=2000 lbs.) which have been reduced to tire "chips" of approximately 1.5 cubic feet of material, can be mixed with and encased in approximately 1.7 cubic feet of concrete and then permanently dispatched to the bottom of the sea, ocean, bay, lake or any other body of water as artificial reef material. Such a three foot tetrahedron has a volume of approximately 3.2 cubic feet and provides approximately 15.6 feet of surface area. Where dimensions and proportions are referenced, they may differ from those set forth in U.S. patent application Ser. No. 800,857 filed Nov. 26, 1991. Those differences can be attributed to additional studies which have been made in the intervening time period, and as such, the differences are not critical since the substance of the invention is independent of the dimensions as well as weights which are expressed. Moreover, those who will be fabricating artificial reef modules in large quantities will doubtless vary proportions, sizes, ingredients of concrete, and the specifications of the tire chips in accordance with availability and price. Within such limits, however, the desire to develop a reef module which will essentially consume otherwise waste material may be achieved.

Furthermore, one must consider that whole tires, chipped tires, incineration ash and other waste materials do not inherently attract marine life. This may be attributable to the exudation of noxious chemicals, or the fact that they are chemically inert, or many other factors. Conversely, concrete is known to provide a substrate or surface which is extremely effective in attracting and supporting a diverse spectrum of marine and fresh water organisms. In addition, concrete serves as an excellent medium for encapsulating tire chips and other waste materials. Therefore, a major objective is achieved by the present invention in developing reef modules of various geometric solid shapes which will inherently attract marine life when clustered with other like modules, while at the same time encapsulating waste material for which there is perhaps no other environmentally enhancing form of disposal. In this context it will be remembered that the earth's available supply of concrete is very substantial, and that man's ability to pollute the environment with automobile tires is similarly incalculable.

The method of the present invention directed to the desirable disposal of cement in ready mix trucks includes the steps of assembling a plurality of geometric solid shaped molds which are constructed with one side or plane being open and facing upward. A biodegradable mold release agent is applied, which may be another waste ingredient of spent cooking oil. Such waste cooking oils are available from most fast food restaurants. The tire chips are staged at a facility conveniently accessible to concrete trucks. Optimally, this location is a concrete facility. A batch plant area, similar to the one found at concrete plants which dispenses sand, cement, rock and other ingredients of concrete, dispenses measured amounts of tire chips and waste concrete. A concrete truck with a load of waste concrete disposes of said load into a hopper container. An adjacent hopper container contains tires chips. An auger type conveyor located at the bottom of each hopper, allows both materials to be precisely dispensed into a common mixer. The mixed blend of concrete and tire chips is then discharged into waiting empty molds. If tire chips are not available, the waste concrete is poured directly into the molds. Provision in the mold of cylindrical rods allows for lifting of the finished units. Alternatively, placing a U-shaped steel reinforcing bar in its inverted position, into the freshly poured cement mixture which is exposed on the open upper face of the mold, provides a lifting point for removal of the artificial reef module, subsequent to the hardening of the concrete. This steel lifting point allows for handling by crane, forklift, backhoe, front-end loader or other heavy equipment. A common practice of cutting and discarding large quantities of reinforcing steel or rebar provides an ample supply of rebar which is easily bent to form the desired U-shaped lifting point. Use of discarded rebar in this fashion likewise serves to recycle this material.

As a consequence, it is a primary object of the present invention to provide a means and method for disposing of waste materials to form biologically productive artificial reefs for enhanced aquatic habitats. A related aspect of the invention is to provide an environmentally enhancing method of recycling large quantities of waste concrete and waste tire chips and lessor quantities of waste steel reinforcing bar and waste vegetable oil.

Upon deployment of numerous modules, another objective of the present invention is achieved by developing underwater clusters of like modules which, when placed in the path of rapidly moving water, will cause an up-welling of the current in the water body and its associated nutrients. This alteration of current flow serves to precipitate further marine life, and create zones of reduced current flow or "quiet" areas between like such structures. Said areas provide refuge and more available nourishment for various aquatic organisms and fishes.

BRIEF DESCRIPTION OF THE DRAWINGS

Further objects and advantages of the present invention will become apparent as the following description of an illustrative embodiment proceeds, taken in conjunction with the accompanying drawings, in which:

FIG. 4 discloses a very simple form of mold to use for forming the tetrahedrons;

FIG. 5 is an exemplary cross-section taken through the exemplary tetrahedron of section 5—5 of FIG. 2;

FIG. 6 is a fold out of the faces of FIG. 2;

FIG. 7 is a typical reef cross-section;

DESCRIPTION OF PREFERRED EMBODIMENTS

Figure 2:
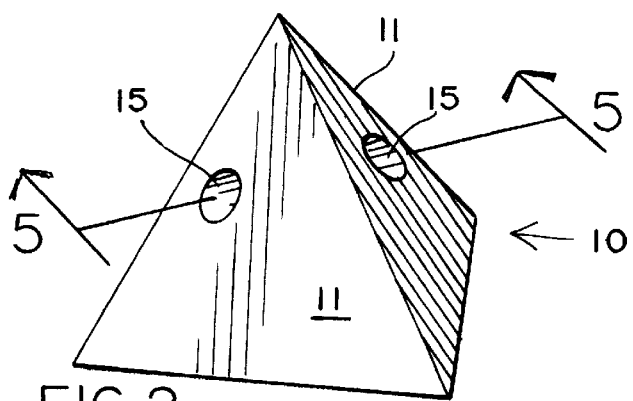
FIG. 2 is an isometric view of an exemplary such tetrahedron showing, in partially phantom lines, lifting eyes which can be employed to raise the same.

The preferred embodiment of the subject invention tetrahedron 10 is shown in FIG. 2. There it will be seen that equilateral triangular faces 11 make up the four faces of the entire tetrahedron. This is shown in fold-out form in FIG. 6 where, when all the edges are folded, an enclosed tetrahedron geometric solid shape exemplary of the present invention is formed.

Figure 11:
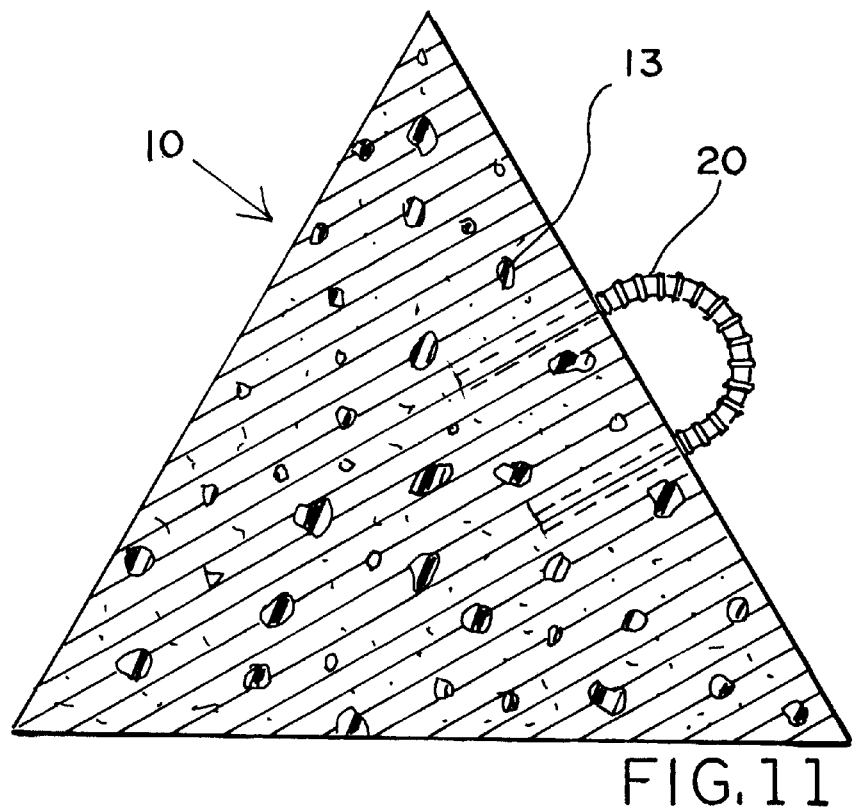
FIG. 11 is a view of similar cross-section and scale as FIG. 10 illustrating the lifting point U-shaped reinforcing bar in a module which includes tire chips.

Particularly as shown in FIG. 5 and FIG. 11, tire chips 13 are used as the aggregate for the mix which is poured into the mold 12. These tire chips 13 are commonly shredded to a nominal chip size of two inches by two inches, with some being of smaller and some of larger dimension. Such tire chips 13 also have the unique characteristic of containing shredded portions of any steel belting, and other shredded surfaces which protrude from the edges of the chips and provide excellent adhesion with the concrete or other binder used to contain the same.

Figure 1:
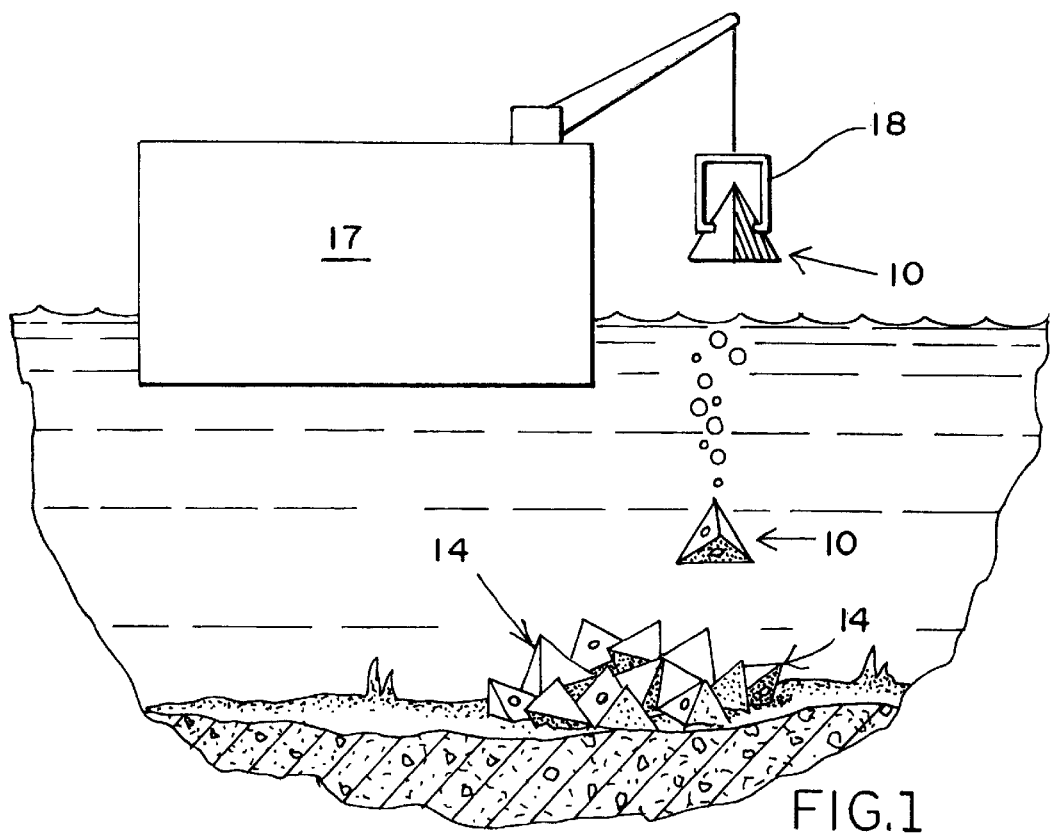
FIG. 1 is a diagrammatic view of a flat deck barge and a hopper barge on the surface of the sea deploying modular tetrahedrons to form a reef on the bottom.
Figure 3:
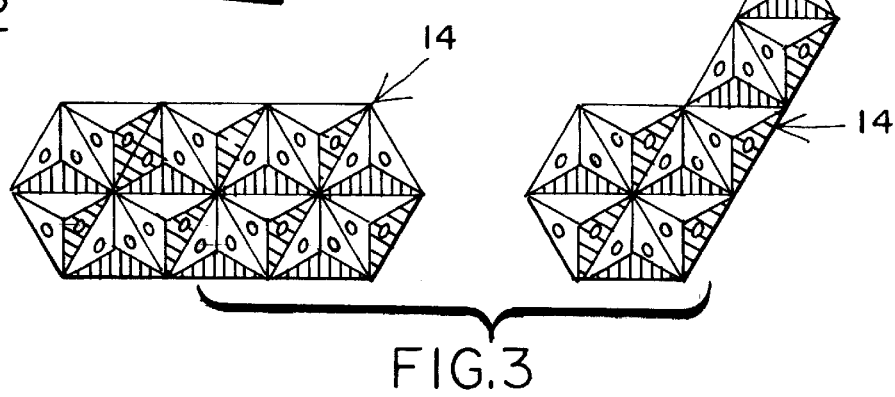
FIG. 3 is a plan view of the bottom of a barge showing how a single layer of the tetrahedron reef units are positioned for transport to the reef sight.
Figure 8:
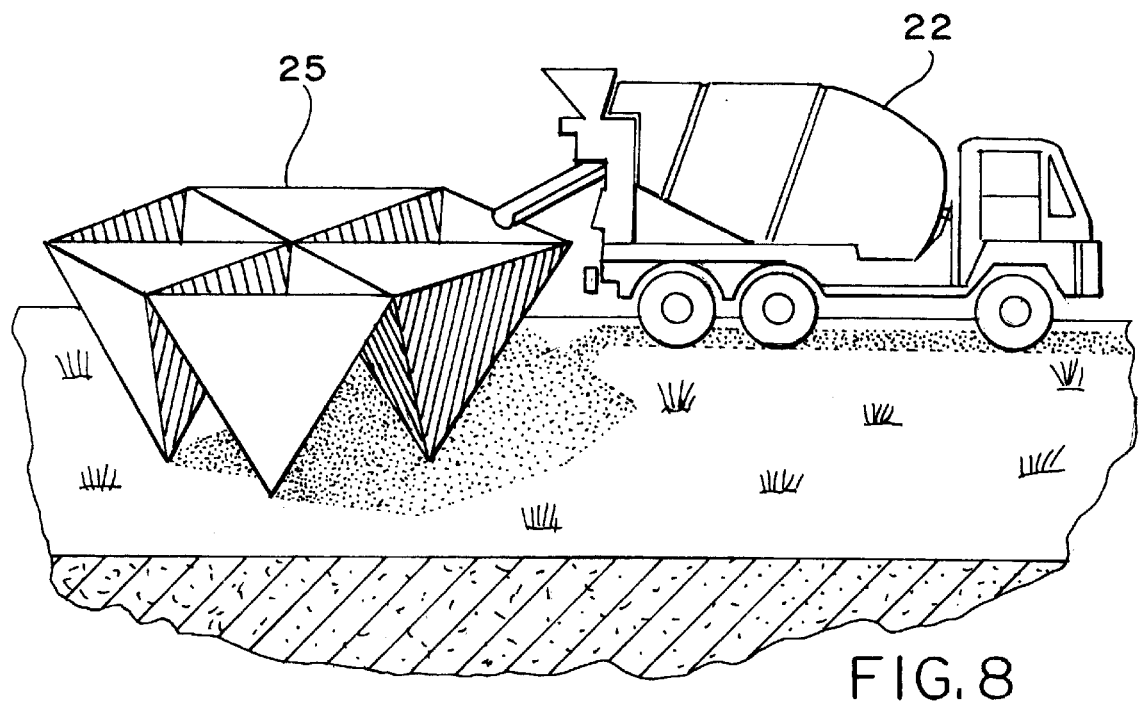
FIG. 8 is a perspective view of clusters of tetrahedron shaped molds, preferably a joined cluster of six to be self-standing, diagrammatically disclosing a ready mix truck in position for discharging cement.
Figure 9:
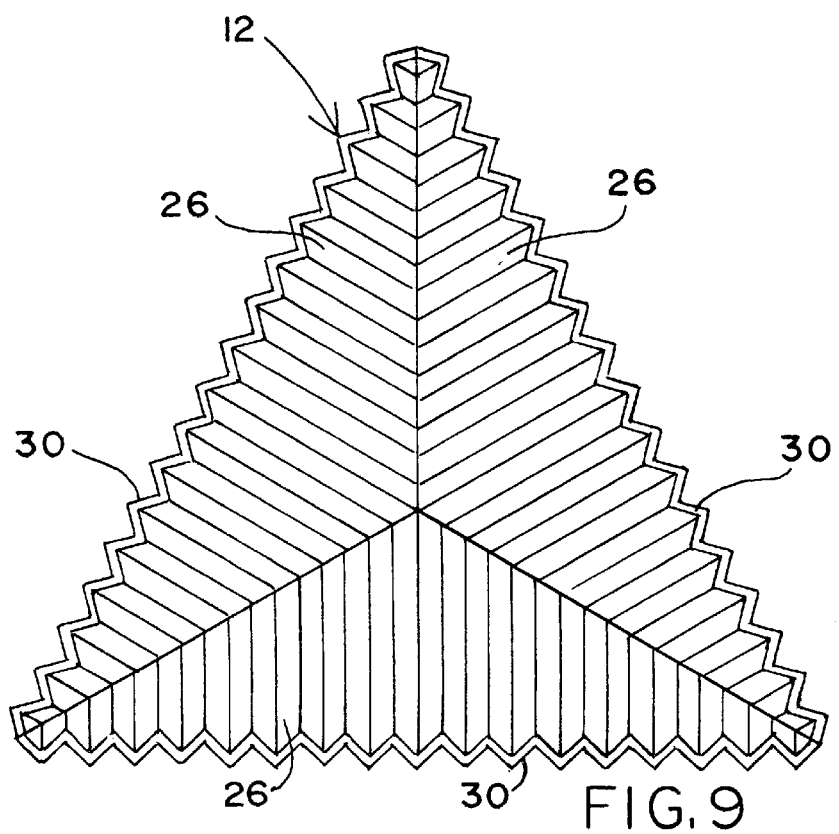
FIG. 9 is an upper view perspective of the tetrahedron shaped mold in enlarged scale from that shown in FIG. 4 and FIG. 8 illustrating an optional washboard or convoluted surface.
Figure 10:
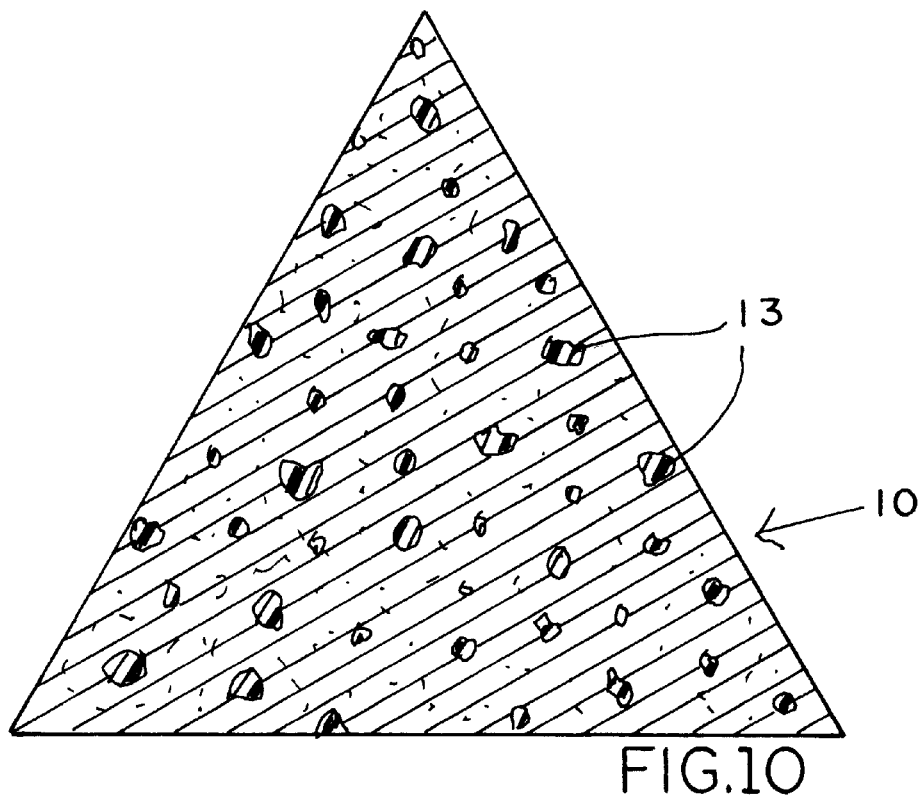
FIG. 10 illustrates in cross section a module in which no tire chips are employed.
Figure 12:
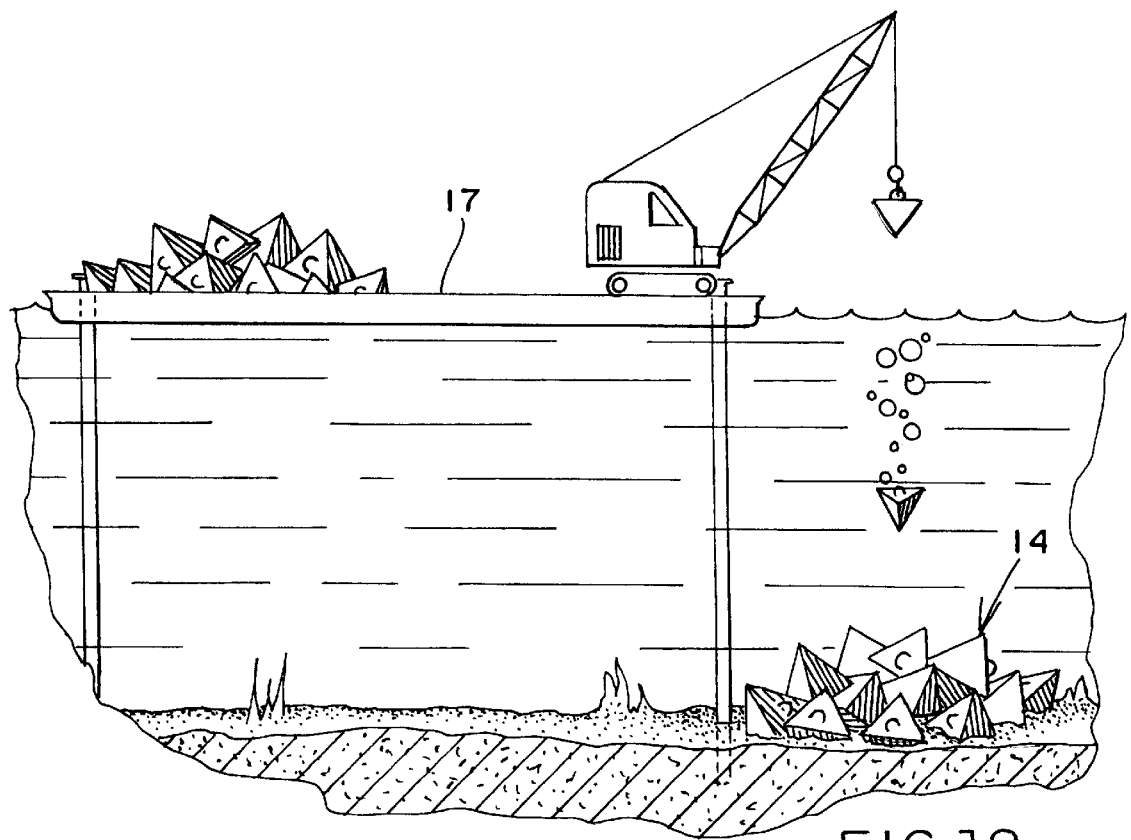
FIG. 12 is a view similar to FIG. 1 of a flat deck barge equipped with a crane which is lifting and deploying a tetrahedron unit furnished with the reinforcing steel lifting point, said lifting point being illustrated in FIG. 11.
Figure 13:
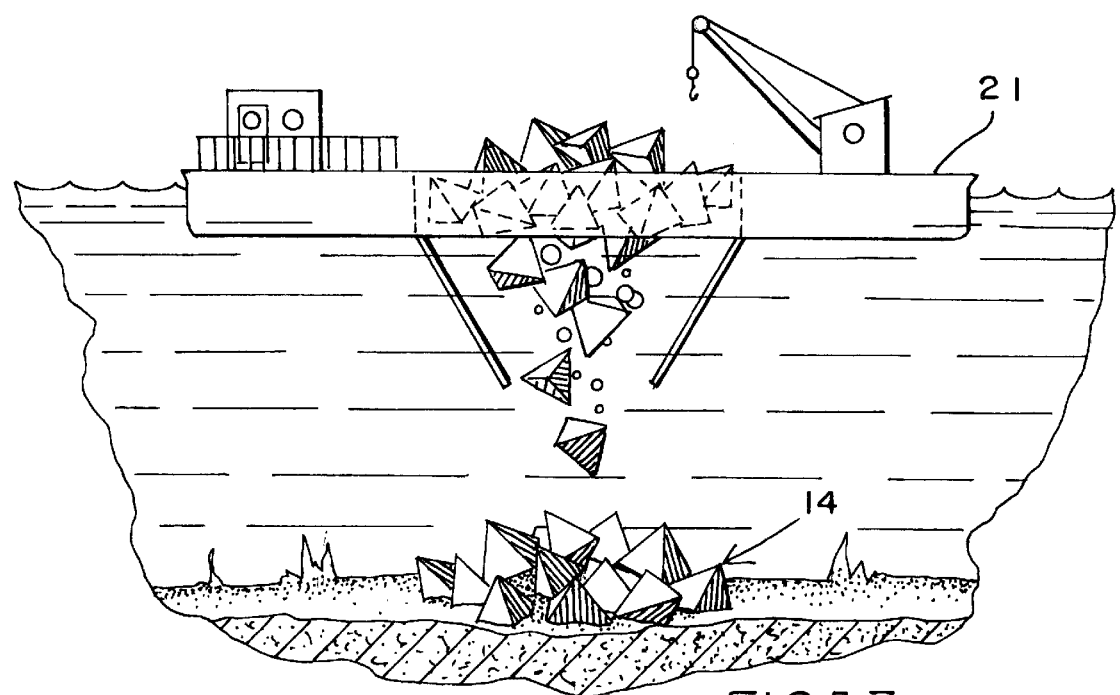
FIG. 13 is a view similar to FIG. 1 and FIG. 12 of a bottom opening or hopper barge deploying tetrahedron shaped units from the surface to form a reef on the bottom.
Figure 14A:
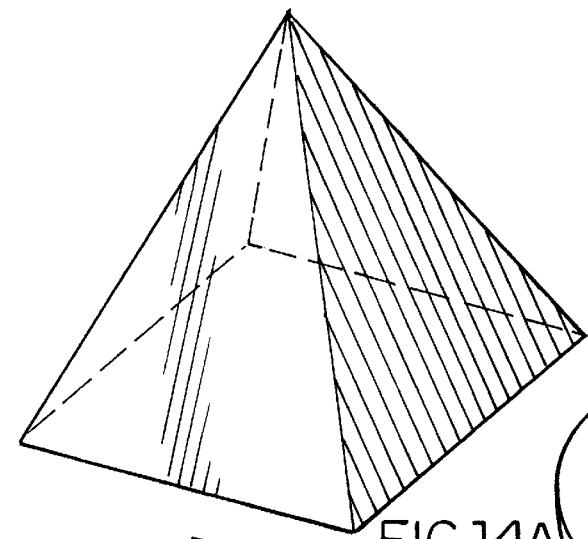
FIGS. 14A, 14B illustrate a pyramid and a hemisphere respectively as two representative optional non-nesting geometric solid shapes which meet the criteria for simplified molding of tire chip concrete, said shapes by definition comprising planar faces wherein each face intersects with the adjacent face at an angle which is not perpendicular.
Figure 14B:
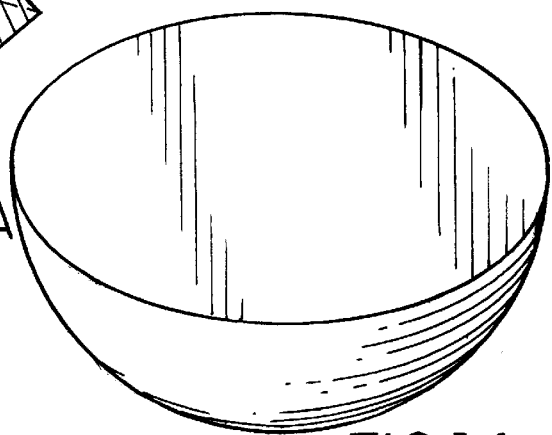
Figure 15A:
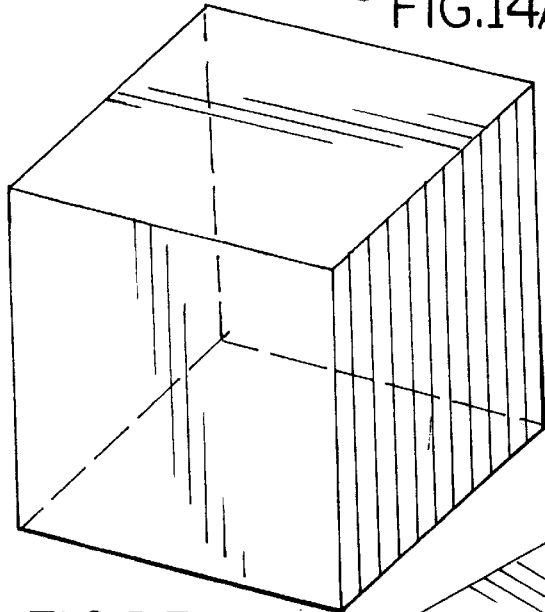
FIGS. 15A, 15B illustrate a cube and a rectangular box respectively as two representative optional geometric solid shapes which meet the criteria for simplified molding of tire chip concrete, said shapes by definition comprising planar faces wherein each face intersects with the adjacent face at an angle which is perpendicular.
Figure 15B:
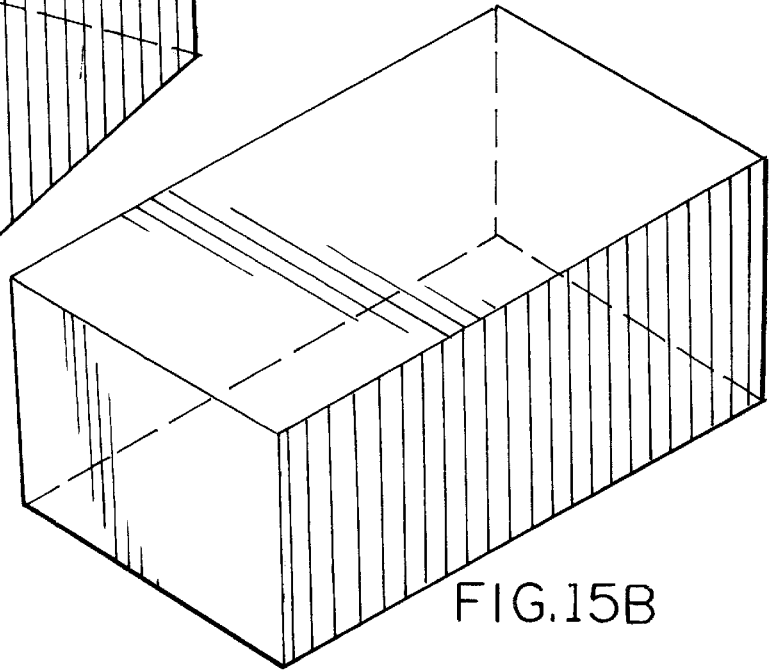

As noted in FIG. 5, and also FIG. 2, provision is made by means of precast cylindrical openings 15 to receive cylindrical prongs of an ice pick-like grip which will permit the same to be on-loaded and off-loaded of a barge 17, such as shown in FIG. 1 by means of the trapeze 18. A simple spreading of the members of the trapeze will remove the cylindrical prongs 16 and the tetrahedrons 10 will drop in the fashion as shown with a vertex ultimately extending downwardly until the module 10 arrives at the reef site 14, again as illustrated in FIG. 1, FIG. 12 and FIG. 13. Similarly, as shown in FIG. 11, another method which allows for barge on-loading and off-loading is the provision of U-shaped steel reinforcing bar 20 which may be used as a lifting point. Said lifting point 20 also serves to assist in lifting or removing units from their molds 4, 25 as poured as illustrated in FIG. 8. Also shown in FIG. 3 are the orientations of the modules 10 as they appear in the bottom of a hopper barge 17, shown from a different perspective in FIG. 13 or other storage or off-loading facility.

In a typical mixture, utilizing the geometric solid form of a tetrahedron module 10 as the chosen mold shape, the following surface area attributes and proportions of concrete mix, (prepared water and cement mixture), and tire chips were observed.

| UNIT HEIGHT | SURFACE AREA | WEIGHT OF: | | |
|---|---|---|---|---|
| | | CONCRETE | TIRE CHIPS | TOTAL |
| 1 ft. | 1.7 ft.$^2$ | 9 lb. | 2 lb. | 11 lb. |
| 2 ft. | 6.9 ft.$^2$ | 73 lb. | 14 lb. | 86 lb. |
| 3 ft. | 15.6 ft.$^2$ | 244 lb. | 47 lb. | 291 lb. |
| 4 ft. | 27.7 ft.$^2$ | 577 lb. | 111 lb. | 688 lb. |
| 5 ft. | 43.3 ft.$^2$ | 1127 lb. | 217 lb. | 1344 lb. |
| 6 ft. | 62.4 ft.$^2$ | 1947 lb. | 374 lb. | 2321 lb. |

Above calculations are based upon construction of 1 ft. high test units and Volume of tetrahedron expressed as $(.11785)L^3$, where L = unit height cubed.

Variations can be made by increasing the percentage of concrete or decreasing it. The current ratio of concrete to tire chips produces a tetrahedron shaped modular unit wherein each tire, (represented as 20 pounds of tire chips), is ballasted by one hundred four (104) pounds of concrete. This ballast ratio equals or exceeds the ratios currently being utilized by the states of Virginia and New Jersey in their construction of tire artificial reefs. Increasing the volume of concrete will produce tetrahedron units with a greater ballast ratio, which are desirable for breakwater or surf zone artificial reef construction.

The greatest cost in the construction of the units is the concrete. However, where waste concrete is utilized, a fee structure evolves for utilization of a facility wherein molds serve as receptacles for waste concrete disposal. The cost savings to the pre-mixed concrete trade to dispose of waste concrete in this manner would be significant. Similarly, municipalities seeking alternatives to the current disposal options of landfill use, burning, or other forms of disposition would also pay a fee for tire chip disposal. This is significant as a useful product, (artificial reef modules), will be fabricated out of waste products, which by definition is the essence of recycling.

As the reefs 14 are developed, particularly as illustrated in FIGS. 1 and 7, the preferential approach is to instantaneously deploy or drop at least 100 tons, or 51 modules of 6 ft. height, or 89 modules of 5 ft. height, etc., from a given position of the barge; which barge, is preferably a hopper or bottom opening barge 21, as illustrated in FIG. 13. When a large "mound" on the bottom is the desired result, the placement operation may take place repeatedly at the same location for many years, and cover areas as large as the entire permitted artificial reef site or over concentrated areas as small as 100 square feet within the boundaries of the reef site. Where a reef is being built, however, a "on the bottom" stacking height of at least three modules is highly desirable to form a complex artificial reef system with high spatial complexity which provides a correspondingly high biological diversity for the breeding and growth of marine life. As a result, any reef with less than three modules in depth will lose the synergistic value of combining several of the tetrahedrons. Conversely, the modules can be dumped to virtually any depth accommodated by the sea and not a hazard to navigation. In this fashion, a municipality with thousands and thousands of tires requiring disposition every year can be accommodated without resort to unsightly landfill construction, burning, or other disposal techniques. A simple and cost effective means to achieve this goal of recycling tires and waste concrete is realized by establishing a facility similar to the one illustrated in FIG. 8 wherein ready mix cement trucks serve to blend measured amounts of concrete and tire chips and jettison the resultant mixture into an awaiting mold cluster 25 or into molds of other various geometric solid shapes.

The Method

The method of forming an artificial reef combines the steps of chipping spent automobile, truck, bicycle, or even airplane tires or like disposable products which are not biodegradable into chunks which can be embedded in an essentially concrete or equivalent material in a variety of geometric solid shapes, such as a tetrahedron, pyramid, cone, cube, rectangular cube and hemisphere. Other geometric solid shapes may be utilized as desired, however, shapes other than the tetrahedron, pyramid and hemisphere (to name a few), have a tendency to "nest" or lie "flat" against each other and are "non-nesting" even when dropped in a random fashion, thereby lessening the likelihood that there will be habitat enhancing spaces established between each and every one of the modules deployed to the bottom of any particular water body. Thereafter, the method further contemplates forming modules utilizing various geometric solid shapes FIGS. 14A, 14B, 15A and 15B and deploying them in a random fashion within the boundaries of a permitted artificial reef site and covering the bottom to a desired stacking height of at least three such units. In addition, the method contemplates forming modules such as the tetrahedron out of a mix of concrete and tire chips in which the weight of the tire chips is approximately half of the weight of tire chips required to fill the module when no other ingredients are placed in it.

It has been discovered that when the tetrahedron shaped modules, constructed in accordance with application Ser. No. 948,159 above, were placed in Atlantic Ocean waters adjacent to Ft. Lauderdale, Florida, that marine life was more readily attracted to the one plane or side of the tetrahedron which faced upward and which (plane or side), was formed at the time the mold received the poured concrete and tire chip mixture. This one side out of a possible four, acquires a roughened texture as compared to the other three sides of the tetrahedron which resemble the relatively smooth interior walls of the mold. It has been demonstrated through scientific research that rough surface textures provide a superior substrate for encrusting marine organisms. Observation of marine life on the tetrahedron artificial reef units deployed off of the east coast of Florida, has resulted in the preliminary conclusion that the marine life are attracted by the roughened surface which is unique to the protruding portions of tire chips. By comparison, similar units formed utilizing standard concrete only and deployed at the same time as the tire chip concrete units, have not yet developed as diverse a biological community of encrusting marine organisms as have the modules containing the tire chips and concrete mixture.

In addition, while the holes which are molded for lifting the module via two tubular like members are desirable, for the purpose of expediency a reversely bent reinforcing bar buried at least six to twelve inches deep in the module will serve as the primary attachment point for lifting, moving and deploying the module.

Second Embodiment

Consistent with the roughened edge, a new discovery lies in the utilization of a corrugated type interior 26 for the three faces of the tetrahedron mold which form the sidewalls of the mold. The grooves are aligned in essentially parallel relationship to the end that the module 10 can be removed from the mold 12 without stripping the mold sides 26. In those instances where additional surface areas required such as a plurality of small protrusions such as cones, the mold sides are pivoted each to the other so they can be opened to remove the mold.

With one hundred of the tire chip modules, and one hundred of the modules without tire chips having been observed on the bottom for at least six months, it has become apparent that the foregoing phenomena do occur. Indeed, all of the modules whether they carry the tire chips or not are attracting marine growth from a seemingly unproductive environment on the water bottom.

A further advantage has been achieved by the utilization of tire chips since the volume which is displaced by the tire chips has a weight less than half of that of the adjacent concrete. Accordingly, the modules with the tire chips are lighter. This lighter weight permits the tetrahedron shaped modules to float more on a muddy, silty or soft bottom portion of the water involved, and therefore expose more of its exterior which, in turn, attracts a greater amount of marine life for a single given module. On the other hand, in applications such as ready mix plant, where every day they have waste cement which comes back in trucks which could not make their delivery because of rain, or for any other reason, dropping the concrete quickly into the molds is a good way of salvaging the spent concrete. Indeed, chunks of that which is scraped out of the interior portion of the ready mix trucks and elsewhere can be admixed with the concrete and while not achieving the light weight of the tire chips as an aggregate, an efficient way is provided to dispose of all of the waste in a concrete plant.

The Modified Method

The present method can be practiced in several forms. One convenient manner is to join the three-sided molds 12 into a honey comb six pack 25 or hexagon relationship to the end that any spillage from one mold falls into the other, and there is virtually no waste from a standpoint of pouring the concrete into the mold. As shown in the drawings, the mold 12 is comprised of three independent faces 30 each of which is secured, desirably by welding, to the other face 30 at its lateral edge. Contemplated is the use of an elongate longitudinal hinge (not shown) at two of the adjacent edges, with the third edge having a pin and latch mechanism such as an enlarged hinge in which the hinge knuckles of one edge overlap and are interspersed between the hinge latch of the adjacent member. Thereafter a hinge pin is dropped into the one section to secure the three together for purposes of molding. Mold release agents such as vegetable oil commonly used in salad dressing or waste cooking oils, when applied in a thin coating, assists materially in removing the module from the. mold or alternatively, stripping the mold from the module. In addition means such as a simple tire valve are provided at the very bottom of the unit and optionally on the sides to the end that compressed air can be used to assist in mold release and in its simplest form, hitting the side of the mold with a rubber hammer or other object will materially assist in stripping the module from the mold.

The invention, when using waste concrete, is independent of the use of tire chips or interdependent when used with tire chips. The same is true when a smooth interior surface mold or roughened or irregular surface mold is utilized.

Although particular embodiments of the invention have been shown and described in full here, there is no such limitation of embodiments. On the contrary, the intention is to cover all modifications, alternatives, embodiments, usages and equivalents as fall within the spirit and scope of the present invention, specification and appended claims.

What is claimed is:

1. An artificial reef module mold, said reef module mold comprising in combination:

a plurality of connected individual pyramid shaped reef molds, each individual pyramid shaped reef mold formed from three equilateral triangular faces, each triangular face including two side legs, a base leg, an apex, an interior surface and an exterior surface, said three triangular faces connected at the side legs and apex to form the individual pyramid shaped reef molds with the base legs of said triangular faces defining an opening, a plurality of grooves formed on the interior surface of each of said triangular faces, the grooves oriented parallel to each other and perpendicular to the respective base leg of each of said triangular faces to form a plurality of ridges and grooves on the artificial reef module mold.

* * * * *